(12) United States Patent
Mutter et al.

(10) Patent No.: US 11,487,687 B2
(45) Date of Patent: Nov. 1, 2022

(54) DEVICE FOR A USER STATION OF A SERIAL BUS SYSTEM AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/414,097

(22) PCT Filed: Dec. 11, 2019

(86) PCT No.: PCT/EP2019/084704
§ 371 (c)(1),
(2) Date: Jun. 15, 2021

(87) PCT Pub. No.: WO2020/126756
PCT Pub. Date: Jun. 25, 2020

(65) Prior Publication Data
US 2022/0066968 A1 Mar. 3, 2022

(30) Foreign Application Priority Data
Dec. 17, 2018 (DE) ...................... 10 2018 221 957.5

(51) Int. Cl.
*G06F 13/376* (2006.01)
*G06F 13/40* (2006.01)

(52) U.S. Cl.
CPC ........ *G06F 13/376* (2013.01); *G06F 13/4022* (2013.01)

(58) Field of Classification Search
CPC ............... G06F 13/376; G06F 13/4022; H04L 2012/40215; H04L 2012/40273
See application file for complete search history.

(56) References Cited

U.S. PATENT DOCUMENTS 5,384,769 A 1/1995 Oprescu et al.
8,094,688 B2 * 1/2012 Kishigami ................ H04L 1/24
370/546

(Continued)

FOREIGN PATENT DOCUMENTS

DE 102015222334 A1 5/2017
DE 102017205785 A1 10/2018

OTHER PUBLICATIONS

ISO 11898-2:2016 Road Vehicles—Controller Area Network (CAN)—Part 2: High-Speed Medium Access Unit. 40 Pages.

(Continued)

*Primary Examiner* — Brian T Misiura
(74) *Attorney, Agent, or Firm* — Norton Rose Fulbright US LLP; Gerard Messina

(57) ABSTRACT

A device for a serial bus system. The device has a receiver receiving a signal from a bus of the bus system. For a message exchanged between user stations of the bus system, a recessive bus state is overwritable by a dominant bus state and the recessive bus state is generated differently in the first communication phase than in the second communication phase. The receiver generates a digital signal based on the received signal, and the signal being output to a communication control unit for evaluating the data contained in the digital signal. The receiver uses a first and second reception threshold for generating the digital signal in the second communication phase, the second reception threshold having a voltage value lower than that of the first reception threshold or higher than the highest voltage value which, during normal operation, is established on the bus for a dominant bus.

13 Claims, 6 Drawing Sheets

(56) References Cited

U.S. PATENT DOCUMENTS

| | | | | |
|---|---|---|---|---|
| 9,606,948 B2* | 3/2017 | Monroe | ............... | G06F 13/372 |
| 2014/0298133 A1* | 10/2014 | Hartwich | ............ | G06F 13/4295 |
| | | | | 714/758 |
| 2017/0070366 A1* | 3/2017 | Hehemann | .......... | H04L 25/0286 |
| 2017/0262400 A1* | 9/2017 | Hartwich | .............. | H04L 1/0075 |
| 2018/0041361 A1* | 2/2018 | Kishigami | .......... | H04L 12/4625 |
| 2018/0205572 A1* | 7/2018 | Kishigami | ........ | H04L 12/40169 |
| 2020/0412583 A1* | 12/2020 | Walker | ................ | H04L 25/0272 |
| 2022/0029850 A1* | 1/2022 | Mutter | .............. | H04L 12/40097 |
| 2022/0052875 A1* | 2/2022 | Hartwich | .......... | H04L 12/40013 |

OTHER PUBLICATIONS

ISO11898-1:2015 Road Vehicles—Controller Area Network (CAN)—Part 1: Data Link Layer and Physical Signalling. 74 Pages.
International Search Report for PCT/EP2019/084704 dated Feb. 20, 2020.

* cited by examiner

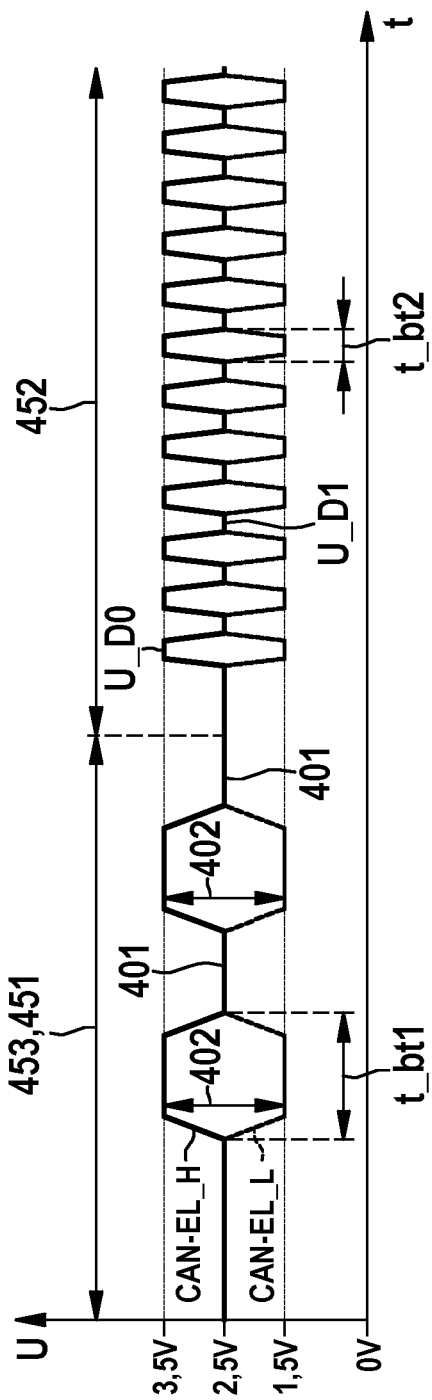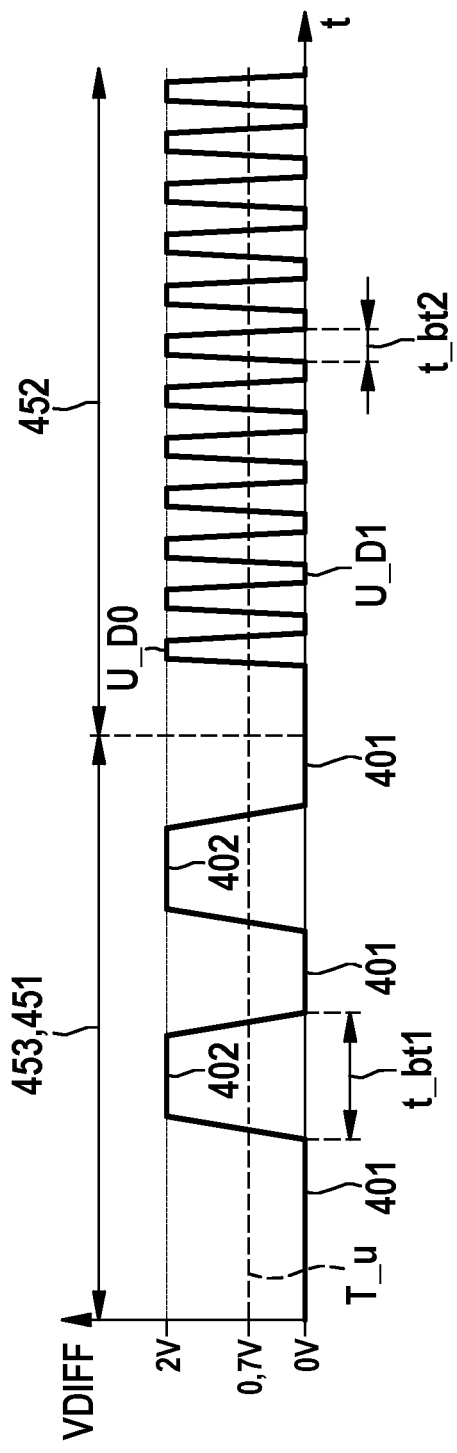

DEVICE FOR A USER STATION OF A SERIAL BUS SYSTEM AND METHOD FOR COMMUNICATION IN A SERIAL BUS SYSTEM

FIELD

The present invention relates to a device for a user station of a serial bus system and to a method for communication in a serial bus system, which operates at a high data rate and with high error robustness.

BACKGROUND INFORMATION

For the communication between sensors and control units, for example in vehicles, a bus system is frequently used, in which data are transmitted as messages in the Standard ISO 11898-1:2015 as CAN protocol specification with Controller Area Network Flexible Data-Rate (CAN FD). The messages are transmitted between the bus users of the bus system, such as sensor, control unit, transmitter, etc.

As the number of functions of a technical system or of a vehicle increases, so, too, does the data traffic in the bus system. Moreover, it is often a requirement that the data must be transmitted faster from the transmitter to the receiver than previously. As a result, the required bandwidth of the bus system will continue to increase.

To be able to transmit data at a higher bit rate than in the case of CAN, an option has been created in the CAN FD message format for switching to a higher bit rate within a message. In such technologies, the maximally possible data rate is increased beyond a value of 1 Mbit/s by using a higher clocking speed in the area of the data fields. Such messages are also referred to below as CAN FD frames or CAN FD messages. In the case of CAN FD, the payload data length is extended from 8 bytes all the way up to 64 bytes and the data transmission rates are significantly higher than in the case of CAN.

Even though a CAN- or CAN FD-based communications network offers numerous advantages with respect to its robustness, for example, it nevertheless has a significantly slower speed as compared to a data transmission in, for example, 100 Base-T1 Ethernet. Moreover, the payload data length achieved so far with CAN FD of up to 64 bytes is too short for some applications.

SUMMARY

It is an object of the present invention to provide a device for a user station of a serial bus system and a method for communication in a serial bus system, which solve the aforementioned problems. A device for a user station of a serial bus system and a method for communication in a serial bus system, in particular, are to be provided, in which a high data rate and an increase in the amount of the payload data per frame may be implemented with great flexibility in the operation of a technical system, in which the bus system is used for communication, and with high error robustness of the communication.

The object may be achieved by a device for a user station of a serial bus system including the features of an example embodiment of the present invention. In accordance with an example embodiment of the present invention, the device has a receiver for receiving a signal from a bus of the bus system, in which a recessive bus state is overwritable by a dominant bus state for a message that is exchanged between user stations of the bus system, and the recessive bus state is generated differently in the first communication phase from the recessive bus state in the second communication phase, the receiver being designed to generate a digital signal on the basis of the signal received by the bus and to output the signal to a communication control unit for evaluating the data contained in the digital signal, the receiver also being designed to use at least one first reception threshold and one second reception threshold in the second communication phase for generating the digital signal, and the second reception threshold having a voltage value, which is lower than the voltage value of the first reception threshold or higher than the highest voltage value which, during normal operation, is established on the bus for a dominant bus state in the second communication phase.

Due to the design of the device, it is also possible to identify a transmission conflict in the event both bus states are actively driven in one frame in the data phase. This also applies if a superposition of driven signals on the bus occurs, as a result of which "analogous" levels are established on the bus. Therefore, an evaluation by a microcontroller in the device and/or by the communication control unit may be omitted, which in such a case is/are no longer able to reliably identify a transmission conflict by comparing transmit signal TXD and received signal RXD, since the resulting received signal is no longer accurately predictable.

Thus, due to the design of the device, each user station of the bus system is able to disrupt or interrupt the transmission of an arbitrary other user station with an error frame. This is very advantageous from the perspective of the user since, in case of an error, time may be saved as a result by aborting a currently transmitted message and by subsequently being able to transmit other information on the bus. This is very useful, in particular, in frames that are longer than a CAN FD frame having 64 bytes in the data phase, in particular in frames that are intended to have 2 kilobytes to 4 kilobytes or more.

As a result thereof, it is possible using the device, which is, in particular, a receiver or a transceiver, to ensure reception of the frames with a high degree of flexibility with respect to instantaneous events during operation of the bus system and with a low error quota, even when increasing the amount of payload data per frame. Thus, it is also possible to communicate in the serial bus system with a high degree of error robustness even if a high data rate and an increase in the amount of payload data per frame take place.

It is therefore, in particular, possible with the aid of the device in the bus system to retain an arbitration known in CAN in a first communication phase, and nevertheless to once again significantly increase the transmission rate compared to CAN or CAN FD.

This also contributes to the implementation of a net data rate of at least 5 Mbit/s to approximately 8 Mbit/s or 10 Mbit/s. In this case, a bit is less than 100 ns in length. In addition, the size of the payload data may be as much as 4096 bytes per frame.

The method carried out by the device may also be used if at least one CAN FD-tolerant CAN user station, which is designed according to the standard of ISO 11898-1:2015, and/or at least one CAN FD user station is/are also present in the bus system, which transmits or transmit messages according to the CAN protocol and/or the CAN FD protocol.

Advantageous further embodiments of the device in accordance with the present invention are disclosed herein.

Furthermore, in accordance with an example embodiment of the present invention, the receiver may be designed to additionally use in the second communication phase for generating the digital signal a third reception threshold, which has a voltage value higher than the highest voltage value, which is driven by a user station of the bus system for a bus state in the second communication phase, another type of transmission conflict being identifiable for the receiver with the second reception threshold than with the third reception threshold.

According to one specific embodiment variant of the present invention, the receiver is designed to check at least the second reception threshold in a defined time window in terms of whether the signal received by the bus no longer falls below or exceeds the second threshold value.

According to one specific embodiment variant of the present invention, the bus states of the signal received by the bus in the first communication phase are generated with a physical layer different from the bus states of the signal received in the second communication phase.

According to one further specific embodiment variant of the present invention, the bus states of the signal received from the bus in the first communication phase have a longer bit time than the bus states of the signal received in the second communication phase.

It is possibly negotiated in the first communication phase which of the user stations of the bus system receives an at least temporarily exclusive, collision-free access to the bus in the subsequent second communication phase.

The device possibly also has a reception threshold adaptation device for evaluating the signal received by the bus with respect to the communication phase currently present and for switching the voltage value and the number of reception threshold(s) used based on the result of the evaluation.

It is possible that the reception threshold adaptation device adds at least one second reception threshold to the first reception threshold if after the first communication phase, in which no exclusive collision-free access of a user station to the bus of the bus system is ensured, a switch is made to the communication phase that includes the exclusive collision-free access to the bus.

In accordance with an example embodiment of the present invention, the device may also have a transmitter for transmitting messages on a bus of the bus system, the transmitter being designed to switch between a first operating mode and a second operating mode when transmitting the various communication phases of a message. In this case, the transmitter in the first operating mode is possibly designed to generate a first data state as the bus state having different bus levels for two bus wires of the bus line and to generate a second data state as the bus state having the same bus level for the two bus wires of the bus line, and the transmitter in the second operating mode being designed to generate a bus state for the first data state as in the first operating mode, and to generate the bus state for the second data state differently from the bus state for the second data state in the first operating mode.

The above-described device may be part of a user station for a serial bus system, which additionally includes a communication control unit for controlling a communication of the user station with at least one other user station of the bus system.

In this case, there is the option that the device is designed to signal the communication control unit using the received signal or using a signal via a separate line if an evaluation of the reception threshold and optionally a temporal correlation between the transmit signal and the received signal indicates that a transmission conflict exists on the bus, and the communication control unit being designed to generate or abort the transmit signal on the basis of the signal and/or to signal the transmission conflict to other user stations of the bus system.

The above-described user station may be part of a bus system that also includes one bus and at least two user stations, which are connected via the bus to one another in such a way that they are able to serially communicate with one another. At least one of the at least two user stations in this case is an above-described user station.

In addition, the aforementioned object may be achieved by a method for communication in a serial bus system in accordance with an example embodiment of the present invention. In an example embodiment of the present invention, the method is carried out with a receiver for receiving a signal from a bus of the bus system, the receiver carrying out the steps: receiving a signal from the bus of the bus system, in which a recessive bus state is overwritable by a dominant bus state for a message exchanged between user stations of the bus system, and the recessive bus state is generated differently in the first communication phase from the recessive bus state in the second communication phase, generating a digital signal on the basis of the signal received from the bus, and outputting the generated digital signal to a communication control unit for evaluating the data contained in the digital signal, the receiver using at least one first reception threshold and one second reception threshold for generating the digital signal in the second communication phase, and the second reception threshold having a voltage value, which is lower than the voltage value of the first reception threshold or higher than the highest threshold value which, during normal operation, is established on the bus for a dominant bus state in the second communication phase.

The method offers the same advantages as mentioned above with respect to the device and/or to the user station.

Further possible implementations of the present invention also include combinations not specifically mentioned of features or specific embodiments described above or below relating to the exemplary embodiments. In this case, those skilled in the art will also add improvements or supplementations to the respective basic form of the present invention, in view of the disclosure herein.

BRIEF DESCRIPTION OF THE DRAWINGS

The present invention is described in greater detail below with reference to the accompanying figures and based on exemplary embodiments.

FIG. 4 shows a temporal curve of bus signals CAN-EL_H and CAN-EL_L, which occur during normal operation on a bus of the bus system according to the first exemplary embodiment of the present invention.

FIG. 5 shows a temporal curve of a differential voltage VDIFF, which results from bus signals CAN-EL_H and CAN-EL_L of FIG. 4.

Unless otherwise indicated, identical or functionally identical elements in the figures are provided with the same reference numerals.

DETAILED DESCRIPTION OF EXAMPLE EMBODIMENTS

Figure 1:
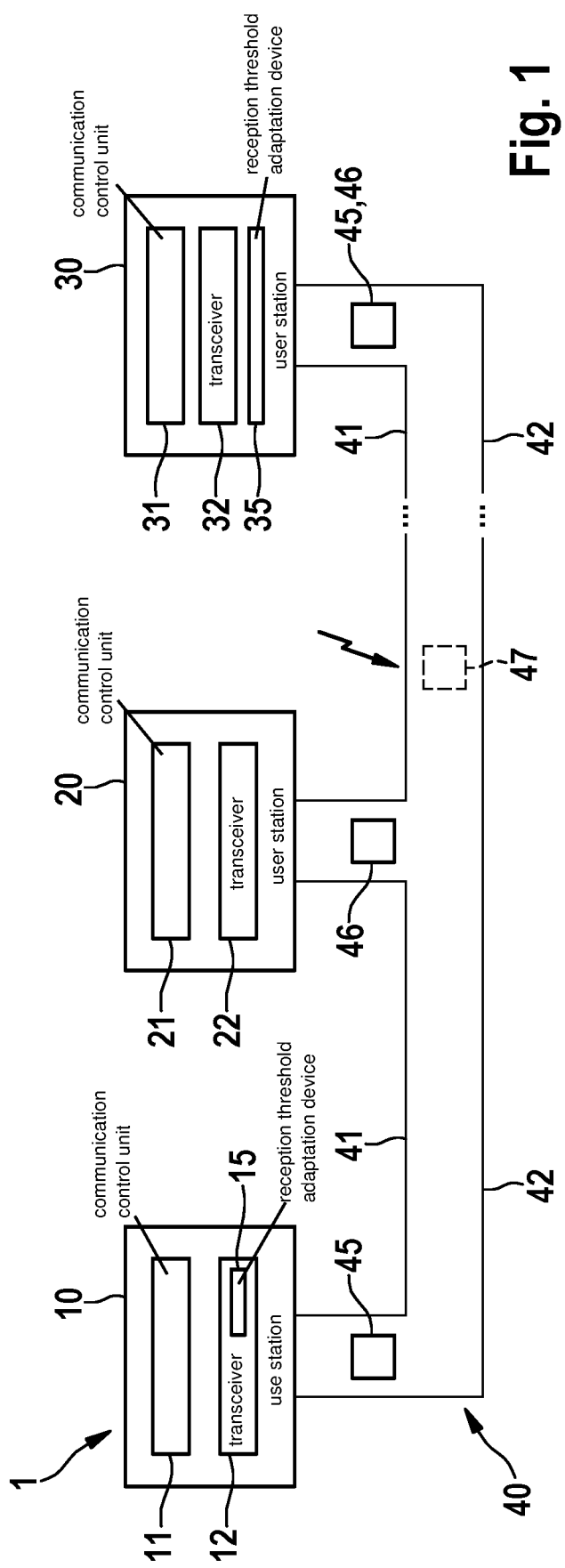
FIG. 1 shows a simplified block diagram of a bus system according to a first exemplary embodiment of the present invention.

FIG. 1 shows as an example a bus system 1, which is designed, in particular, as the basis for a CAN bus system, a CAN FD bus system, a CAN EL (now labeled CAN XL) bus system and/or modifications thereof, as described below. The Controller Area Network Extra Long (originally labeled CAN EL, and which is now labeled as CAN XL) is a third generation of the CAN data link layer and supports all three protocol types (Classical CAN, CAN FD, and CAN EL/XL). Similar to CAN FD, there are two bit-timing settings specified. Bus system 1 may be used in a vehicle, in particular, in a motor vehicle, in an aircraft, etc., or in the hospital, etc.

Bus system 1 in FIG. 1 has a plurality of user stations 10, 20, 30, each of which are connected to a bus 40 that includes a first bus wire 41 and a second bus wire 42. Bus wires 41, 42 may also be called CAN_H and CAN_L or CAN_EL_H and CAN-EL_L and are used for transmitting electrical signals after the differential levels or dominant levels are coupled in or for generating recessive levels for a signal in the transmitting state. Messages 45, 46 are serially transmittable via bus 40 in the form of signals between individual user stations 10, 20, 30. If an error occurs in the communication on bus 40, as depicted by the jagged black block arrow in FIG. 1, an error frame 47 (error flag) may be transmitted. User stations 10, 20, 30 are, for example, control units, sensors, display devices, etc., of a motor vehicle.

As shown in FIG. 1, user station 10 has a communication control unit 11, a transceiver 12 and a reception threshold adaptation device 15. User station 20 on the other hand has a communication control unit 21 and a transceiver 22. User station 30 has a communication control unit 31, a transceiver 32 and a reception threshold adaptation device 35. Transceivers 12, 22, 32 of user stations 10, 20, 30 are each directly connected to bus 40, even though this is not illustrated in FIG. 1.

Communication control units 11, 21, 31 are each used to control a communication of respective user stations 10, 20, 30 via bus 40 with at least one other user station of user stations 10, 20, 30, which are connected to bus 40.

Communication control unit 11 creates and reads first messages 45, which are modified CAN messages 45, for example. Modified CAN messages 45 in this case are structured on the basis of a CAN-EL format, which is described in greater detail in connection with FIG. 2.

Communication control unit 21 may be designed similarly to a conventional CAN controller according to ISO 11898-1:2015. Communication control unit 21 creates and reads second messages 46, for example classical CAN messages 46. Classical CAN messages 46 are structured according to the classical base format, in which a number of up to 8 data bytes may be included in message 46. Alternatively, classical CAN message 46 is structured as a CAN FD message, in which a number of up to 64 data bytes may be included, which are additionally transmitted at a significantly faster data rate than in classical CAN message 46. In the latter case, communication control unit 21 is designed similarly to a conventional CAN FD controller.

Communication control unit 31 may be designed to provide for or receive from transceiver 32 as needed a CAN EL message 45 or a classical CAN message 46. Communication control unit 31 thus creates and reads a first message 45 or second message 46, first and second message 45, 46 differing by their data transmission standard, namely in this case CAN EL or CAN. Alternatively, classical CAN message 46 is structured as a CAN FD message. In the latter case, communication control unit 31 is designed similarly to a conventional CAN FD controller.

Transceiver 12 may be designed similarly to a CAN EL transceiver with the exception of the differences described in more precise detail below. Transceiver 22 may be designed similarly to a conventional CAN transceiver or CAN FD transceiver. Transceiver 32 may be designed to provide for or receive from communication control unit 31 as needed messages 45 according to the CAN-EL format or messages 46 according to the present CAN base format. Transceivers 12, 32 are additionally or alternatively designable similarly to a conventional CAN FD transceiver.

A formation and then transmission of messages 45 using the CAN EL format as well as the reception of such messages 45 are implementable using the two user stations 10, 30.

Figure 2:
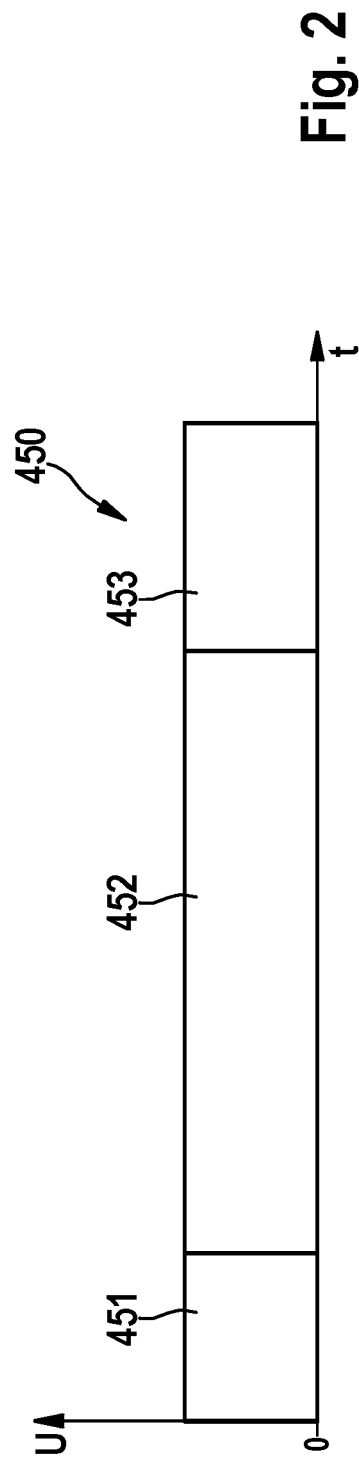
FIG. 2 shows a diagram for illustrating the structure of messages, which may be transmitted by a transceiver for a user station of the bus system according to the first exemplary embodiment of the present invention.

FIG. 2 shows for message 45 a CAN EL frame 450 as it is transmitted by transceiver 12 or transceiver 32. For the CAN communication on bus 40, CAN EL frame 450 is subdivided into different communication phases 451 through 453, namely an arbitration phase 451, a data phase 452 and an end of frame phase 453.

In arbitration phase 451, it is negotiated bitwise between user stations 10, 20, 30 with the aid of an identifier as to which user station 10, 20, 30 wishes to transmit message 45, 46 with the highest priority and therefore obtains exclusive access to bus 40 of bus system 1 for the next period of time for transmitting in subsequent data phase 452.

In data phase 452, the payload data of the CAN-EL frame or of message 45 are transmitted. The payload data may have, as a function of the value range of a data length code, for example, up to 4096 bytes or a higher value.

A check sum of the data of data phase 452, including the stuff bits, which are inserted by the transmitter of message 45 as an inverse bit after a predetermined number of identical bits, in particular 10 identical bits, in each case, may be contained in end of frame phase 453, for example, in a check sum field. At least one acknowledge bit may also be contained in an end field in end of frame phase 453. A sequence of 11 identical bits may also be present, which indicate the end of CAN EL frame 450. The at least one acknowledge bit may be used to communicate whether or not a receiver has discovered an error in received CAN EL frame 450 or in message 45.

A physical layer similar to CAN and CAN FD is used in arbitration phase 451 and in end of frame phase 453. The physical layer corresponds to the bit transfer layer or layer 1 of the conventional OSI model (Open Systems Interconnection Model).

One important point during phases 451, 453 is that the conventional Carrier Sense Multiple Access with Collision Resolution (CSMA/CR) method is used, which allows simultaneous access of user stations 10, 20, 30 to bus 40 without destroying more highly prioritized message 45, 46. In this way, it is possible to add further bus user stations 10, 20, 30 to bus system 1 in a relatively simple manner, which is very advantageous.

The result of the CSMA/CR method is that there must be so-called recessive states on bus 40, which are able to be overwritten with dominant states by other user stations 10, 20, 30 on bus 40. High-impedance conditions are prevalent in the recessive state at individual user stations 10, 20, 30 which, in combination with the parasites of the bus circuitry, result in longer time constants. This results in a limiting of the maximum bit rate of the present CAN FD physical layer currently to approximately 2 megabits per second in real vehicle use.

A transmitter of message 45 starts a transmission of bits of data phase 452 on bus 40 only if user station 10 as the transmitter has won the arbitration and user station 10 as the transmitter thus has exclusive access to bus 40 of bus system 1 for transmitting.

More generally, the following differing properties may be implemented in the bus system using CAN EL as compared to CAN or CAN FD:
a) taking over and, if necessary, adapting proven properties responsible for the robustness and user friendliness of CAN and CAN FD, in particular, frame structure including identifier and arbitration according to the CSMA/CR method,
b) increasing the net data transmission rate to approximately 10 megabits per second,
c) raising the size of the payload data per frame to approximately 4 kilobytes.

Figure 3:
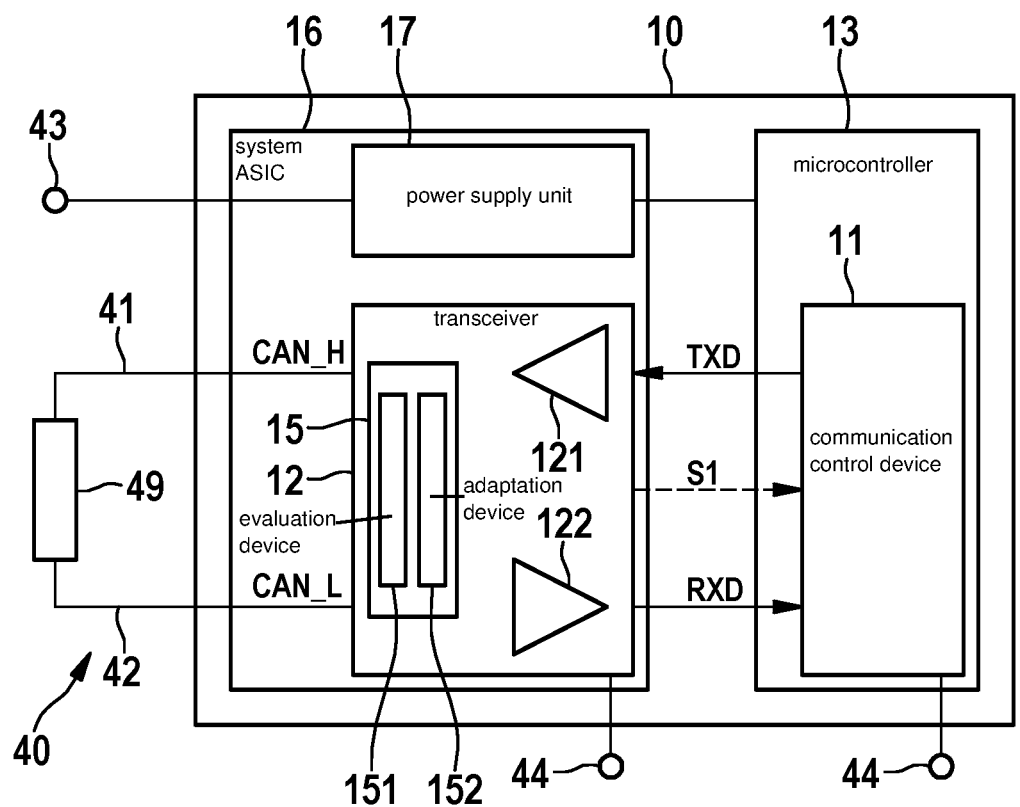
FIG. 3 shows a simplified schematic block diagram of a user station of the bus system according to the first exemplary embodiment of the present invention.

FIG. 3 shows the basic structure of user station 10 including communication control unit 11, transceiver 12 and reception threshold adaptation device 15. User station 30 is structured similarly as shown in FIG. 3, except that reception threshold adaptation device 35 is not integrated into transceiver 32, but is provided separately from communication control unit 31 and transceiver 32. User station 30 and reception threshold adaptation device 35 are therefore not described separately. The following described functions of device 15 are identically present in device 35.

According to FIG. 3, user station 10, in addition to communication control unit 11, transceiver 12 and device 15, also has a microcontroller 13, to which communication control unit 11 is assigned, and a system ASIC 16 (ASIC=Application Specific Integrated Circuit) which, alternatively, may be a system basis chip (SBC), on which multiple functions required for an electronic module of user station 10 are combined. In addition to transceiver 12, a power supply unit 17 is also integrated in system ASIC 16, which supplies transceiver 12 with electrical power. Power supply unit 17 normally supplies a voltage CAN_Supply of 5 V. Depending on the need, however, power supply unit 17 may supply another voltage having a different value. In addition or alternatively, power supply unit 17 may be designed as a current source. Reception threshold adaptation device 15 has an evaluation unit 151 and an adaptation unit 152.

Between communication control unit 11 and transceiver 12, a separate line is optionally present, via which an additional signal S1 may be transmitted, using which a transmission conflict on bus 40 may be transmitted to communication control unit 11 in data phase 452, as described more precisely below.

Transceiver 12 also has a transmitter 121 and a receiver 122. Even though reference is always made below to transceiver 12, it is alternatively also possible to provide receiver 122 in a separate device externally of transmitter 121. Transmitter 121 and receiver 122 may be structured similarly to a conventional transceiver 22. Transmitter 121 may include, in particular, at least one operation amplifier and/or one transistor. Receiver 122 may include, in particular, at least one operation amplifier and/or one transistor.

Transceiver 12 is connected to bus 40, more specifically, to its first bus wire 41 for CAN_H or CAN-EL_H and to its second bus wire 42 for CAN_L or CAN-EL_L. The voltage supply for power supply unit 17 for supplying first and second bus wires 41, 42 with electrical power, in particular, with voltage CAN-Supply, takes place via at least one connection 43. The connection to ground or CAN_GND is implemented via a connection 44. First and second bus wires 41, 42 are terminated with a terminating resistor 49.

First and second bus wires 41, 42 are connected in transceiver 12 not only to transmitter 121 and to receiver 122, even though for the sake of simplicity, the connection in FIG. 3 is not shown. First and second bus wires 41, 42 are also connected to device 15 in transceiver 12.

During operation of bus system 1, transmitter 121 converts a transmit signal TXD or TxD of communication control unit 11 to corresponding signals CAN-EL_H and CAN-EL_L for bus wires 41, 42 and transmits these signals CAN-EL_H and CAN-EL_L to the terminals for CAN_H and CAN_L on bus 40, as shown in FIG. 4.

Receiver 122 forms a received signal RXD or RxD from signals CAN-EL_H and CAN-EL_L received from bus 40 according to FIG. 4 and forwards same to communication control unit 11, as shown in FIG. 3. With the exception of an idle state or standby state, transceiver 12 always listens with receiver 122 during normal operation to a transmission of data or messages 45, 46 on bus 40, in particular, regardless of whether or not transceiver 12 is the transmitter of message 45.

According to the example of FIG. 4, signals CAN-EL_H and CAN-EL L in aforementioned communication phases 451, 453 have dominant and recessive bus levels 401, 402, as known from CAN. In contrast, signals CAN-EL_H and CAN-EL_L differ in data phase 452 from conventional signals CAN_H and CAN_L, as described more precisely below. A differential signal VDIFF=CAN-EL_H−CAN-EL_L is formed on bus 40, which is shown in FIG. 5.

As is discernible from the left-hand portion of FIG. 4, transmitter 121 drives dominant states 402 of differential signals CAN-EL_H, CAN-EL_L differently only in aforementioned communication phases 451, 453. In contrast, the bus levels on bus line 3 for recessive states 401 in aforementioned communication phase 451, 453 are equal to voltage Vcc or CAN-Supply of, for example, 2.5 V. This results in a value of 0 V for a voltage VDIFF=CAN-EL_H−CAN-EL_L for recessive states 401 (logic '0' of transmit signal TxD) and a value of approximately 2.0 V for dominant states 402 (logic '1' of transmit signal TxD).

If transceiver 12, in particular, its device 15, recognizes the end of arbitration phase 451, then transmitter 121 is switched from the state shown in the left-hand portion of FIG. 4 for data phase 452 into the state shown in the right-hand portion of FIG. 4. Transmitter 121 is thus switched from a first operating mode into a second operating mode.

According to the right-hand portion of FIG. 4, bus states U_D0, U_D1 are established in faster data phase 452 for signals CAN-EL_H, CAN-EL_L corresponding to data states Data_0 and Data_1 of transmitted signal TXD. For this purpose, transmitter 121 again drives dominant states 402 of differential signals CAN-EL_H, CAN-EL_L differently, as in aforementioned communication phases 451, 453. In contrast, recessive states 401 are driven partially to completely by transmitter 121 or transceiver 12. For this purpose, transmitter 121 or transceiver 12 actively merges the two bus lines 41, 42 in the transition from dominant to recessive for a short period of time, and thus attenuates the oscillations of bus wires 41, 42. Recessive states 401 are thus generated differently in aforementioned communication phases 451, 452 from recessive states U_D1 in data phase 452. In other words, the generation of recessive states 401 in communication phases 451, 453 differs from the generation of recessive states U_D1 in data phase 452.

The sequence of data states Data_0 and Data_1 and thus resulting bus states U_D0, U_D1 for signals CAN-EL_H, CAN-EL_L in FIG. 4 and the thus resulting curve of voltage VDIFF of FIG. 5 serve merely to illustrate the function of transceiver 12. The sequence of data states Data_0 and Data_1 and thus bus states U_D0, U_D1 is selectable as needed.

In the states shown in FIG. 4 and described above, the bus levels on the bus line of bus 40 in state Data_0 are identical in all communication phases 451 through 453 and are at approximately 2.5 V, as illustrated in FIG. 5.

In other words, transmitter 121 generates in a first operating mode according to FIG. 4 a first data state, for example, Data_0, as bus state 402 having different bus levels for two bus wires 41, 42 of the bus line and a second data state, for example, Data_1, as bus state 401 having the same bus level for the two bus wires 41, 42 of the bus line of bus 40.

Transmitter 121 also drives first and second data states Data_0, Data_1, in each case at least partially, for the time curves of signals CAN-EL_H, CAN-EL_L in a second operating mode that includes data phase 452, so that bus states U_D0, U_D1 of FIG. 4 and FIG. 5 are formed for the two bus wires 41, 42 of the bus line of bus 40. The difference between the physical layer of CAN in communication phases 453, 451 and above-described physical layer CAN FD SIC in data phase 452 is that recessive states U_D1 in data phase 452 is partially to completely driven by transmitter 121 or transceiver 12. At a bit rate of 10 Mbit/s in data phase 452, a bit time totals 100 ns. The oscillations in real bus system 1 normally last up to several hundred nanoseconds; this means the attenuation circuit of CAN FD SIC is active over complete recessive bit time t_b2 (=100 ns).

Thus, bit time duration t_bt2 in data phase 452 in the example of FIG. 4 and FIG. 5 shown is significantly shorter than bit time duration t_bt1, which is used in arbitration phase 451 and end of frame phase 453. Transmission therefore occurs in data phase 452 at a higher bit rate than in arbitration phase 451 and in end of frame phase 453. In this way, the transmission speed in bus system 1 may be increased even further than in CAN FD.

As depicted in FIG. 5, receiver 122 uses in communication phases 451, 453 first reception threshold T_u known from CAN/CAN FD and having the typical condition of 0.7 V according to the ISO 11898-2:2016, in order to be able to reliably identify bus states 401, 402 in the first operating mode.

Figure 9:
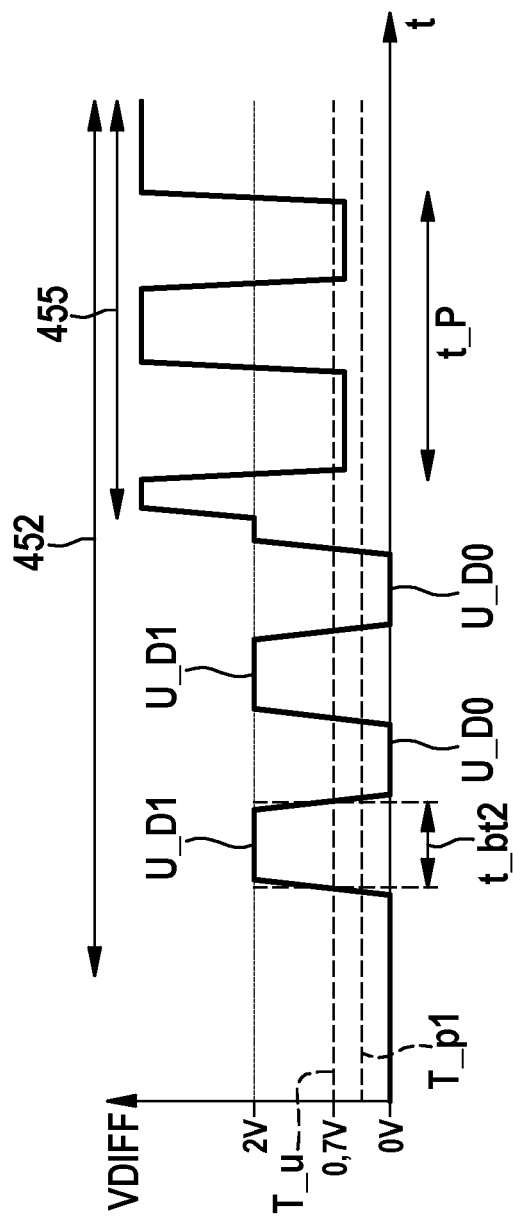
FIG. 9 shows a temporal curve of a differential voltage VDIFF, which results from bus signals CAN-EL_H and CAN-EL_L of FIG. 8, and which is evaluated using reception thresholds of a receiver according to the first exemplary embodiment of the present invention.

As described with reference to FIG. 6 through FIG. 9, receiver 122 also uses a reception threshold T_p1 in data phase 452, which is at approximately 0.3 V, which is shown in FIG. 9. For this purpose, reception threshold adaptation device 15 adapts the previously only one used reception threshold T_u for receiver 122 to the two reception thresholds T_u, T_p1 or adds reception threshold T_p1 to reception threshold T_u.

FIG. 6 through FIG. 9 show for data phase 452 a signal curve of signals TxD1, TxD2, CAN-EL_H and CAN-EL_L and their differential voltage VDIFF=CAN-EL_H−CAN-EL_L. In the case shown in FIG. 6 through FIG. 9, transmitter 121 transmits, for example, transmit signal TxD1 for a frame 450, user station 30, which is actually only a receiver of frame 450 in data phase 452 wishing, for example, to ensure an abort of frame 450.

There are various reasons why an abort of frame 450 is to take place:
  user station 30 as RX user station must transmit a higher priority message 45, 46, and/or
  user station 30 as RX user station detected an error in the header check sum (CRC=Cyclic Redundancy Check) of CAN EL message 45 and wishes to signal this, and/or
  user station 20, which is a CAN FD user station, possibly does not recognize the switch to the format of frame 450 due to a bit error and transmits an error frame 47 during data phase 452 of frame 450.

Figure 6:
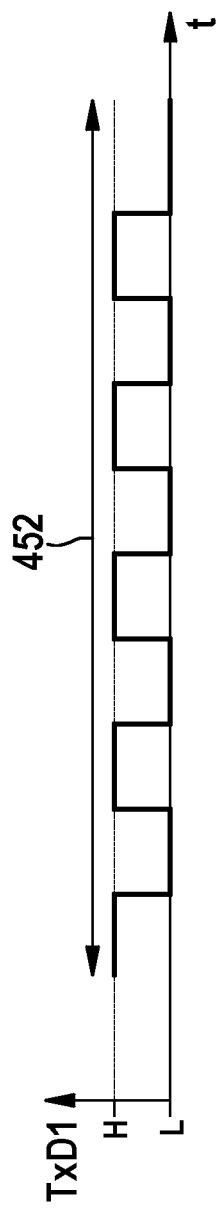
FIG. 6 and FIG. 7 show a temporal curve of a transmit signal TxD1 in a data phase of a message, which is transmitted by a first user station of the bus system according to the first exemplary embodiment of the present invention, and of a transmit signal TxD2, which is transmitted by another user station for aborting transmit signal TxD1.
Figure 7:
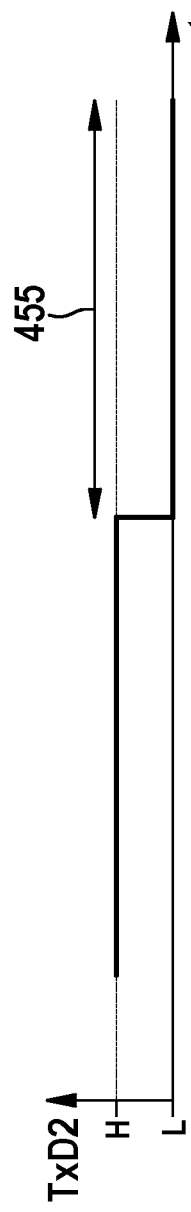
Figure 8:
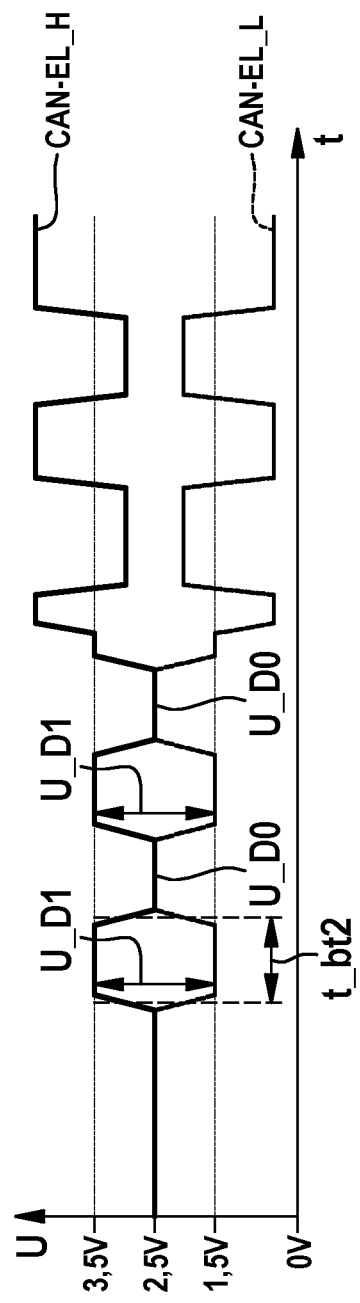
FIG. 8 shows a temporal curve of bus signals CAN-EL_H and CAN-EL_L, which are established on the bus due to transmit signals TxD1, TxD2 of FIG. 6 and FIG. 7.

If, for example, user station 30 wishes to ensure an abort of frame 450, which transmitter 121 transmits with signal TxD1 of FIG. 6, then user station 30 transmits transmit signal TxD2 according to FIG. 7 to bus 40. Signal curves for CAN-EL_H and CAN-EL_L and their differential voltage VDIFF are established as a result. Voltage states, which deviate from the voltage states on bus 40 during normal operation of data phase 452, therefore result on bus 40 in phase 455 of the transmission of error frame 47, which starts with the descending edge of transmit signal TxD2.

More generally, it is the case that the transmitting user station that transmits transmit signal TxD1 switches in data phase 452 to an operating mode for driving the bus line, whereas for all receiving user stations, such as user station 30, the different reception thresholds Td, T_p1 shown in FIG. 9 are connected in, as described below. In this case, however, the bus driver of receiving user station 30 remains in the passive reception state (CAN recessive state) until receiving user station 30 potentially transmits error frame 47, as shown in FIG. 7 for transmit signal TxD2 and as mentioned above. Error frame 47 according to the right-hand portion of FIG. 7 is then actively transmitted as "dominant."

If, in the above-described case of user station 30, an error frame 47 is transmitted, a bit having a positive differential voltage VDIFF, i.e., bus state U_D0 is, from the perspective of all user stations 10, 20, 30, subsequently further amplified or positive differential voltage VDIFF is increased. In contrast, a recessive bit formed as bus state U_D1 on bus 40 is increased from differential voltage VDIFF=0 V to a differential voltage VDIFF of approximately 2 V/2. The resulting voltage value for bus state U_D1 is strongly a function of the parameters of driving transceivers 12, 22, 32 or of transmitter 121. Using conventional reception threshold value T_u of typically 0.7 V, it is not yet possible to recognize whether a conflict by an error frame 47 (error flag) exists.

Second reception threshold value T_p1 of data phase 452 is therefore adjusted in such a way that differential voltage VDIFF in fact falls below first reception threshold T_u, but not below second reception threshold T_p1. Thus, the conflict may be detected for the case in which a recessive bit is to be transmitted, i.e., bus state U_D1 is intended, and this bus state is superposed by an error frame 47.

If receiver 122 of user station 10 therefore recognizes that differential voltage VDIFF no longer falls below reception threshold t_p1, then receiver 122 recognizes that a transmission conflict is present on bus 40. Transmitter 121 namely no longer has exclusive collision-free access to bus 40 in data phase 452. Receiver 122 recognizes this transmission conflict on bus 40 if TxD1=H (high) applies AND T_p1 is not fallen below (within propagation time-compensated bit time t_bt2).

In the described assessment of whether or not a transmission conflict is present, receiver 122 or transceiver 12 takes the signal propagation times in bus system 1 into account, which result in a time offset of transmit signal TXD to signals CAN-EL_H and CAN-EL_L on bus 40 up to and including the output of receiver 122, at which received signal RXD is output. The propagation times are compensated for in the case of the described assessment. The propagation times of signals CAN-EL_H and CAN-EL_L on bus 40, in particular, are compensated for in the case of the described assessment.

The conflict is signaled in data phase 452 by a signal from receiver 122 or transceiver 12 to communication control unit 11. The signal may be received signal RXD that receiver 122 or transceiver 12 alters using a predetermined bit pattern in order to signal the conflict. Alternatively or in addition, receiver 122 or transceiver 12 may generate a separate signal S1 that is transmitted via a separate signal line to communication control unit 11 and, in particular, has at least one switching pulse or a predetermined bit pattern for signaling the conflict. Because the transmission conflict is signaled to communication control unit 11 in data phase 452, the bit error check conventionally used in the classic CAN by comparing transmit signal TXD with received signal RXD may be replaced by the check of the conflict signaling signal. The conflict signaling signal has, in particular, a predetermined bit pattern that signals the transmission conflict. The conflict signaling signal may, in particular, transmit a '1' as an "OK signal" and a '0' as a "conflict message."

Communication control unit 11 responds to the signaled transmission conflict in data phase 452 by aborting data phase 452 and, if necessary, also by transmitting a bit pattern that signals other user stations 20, 30 the end of data phase 452.

According to one modification of the above-described assessment, reception threshold T_p1 in a further variant is checked in a defined time window t_P according to FIG. 9 as to whether differential voltage VDIFF no longer falls below reception threshold T_p1. In this case, time window t_P is selected, in particular, in such a way that reception threshold T_p1 would have to be fallen below at least two times during the data transmission in data phase 452. If this is not the case, receiver 122 or transceiver 12 recognizes that the transmission conflict is present and generates the received signal and/or signal S1 accordingly.

An advantage of the mentioned modification or second variant is that it is not necessary to consider transmitted signal TxD1 and its propagation time compensation.

Time window t_P is optionally selectably configurable. As a result, receiver 122 or transceiver 12 is very advantageously adaptable to the respective conditions of bus system 1.

A particular advantage of the above-described variants of the assessment is that the design of receiver 122 or transceiver 12 is applicable to homogenous CAN-EL bus systems, in which only CAN EL messages 45 and no CAN FD messages 46 are sent, as well as to mixed bus systems, in which either CAN EL messages 45 or CAN FD messages 46 are sent. Receiver 122 or transceiver 12 is therefore universally applicable.

Figure 10:
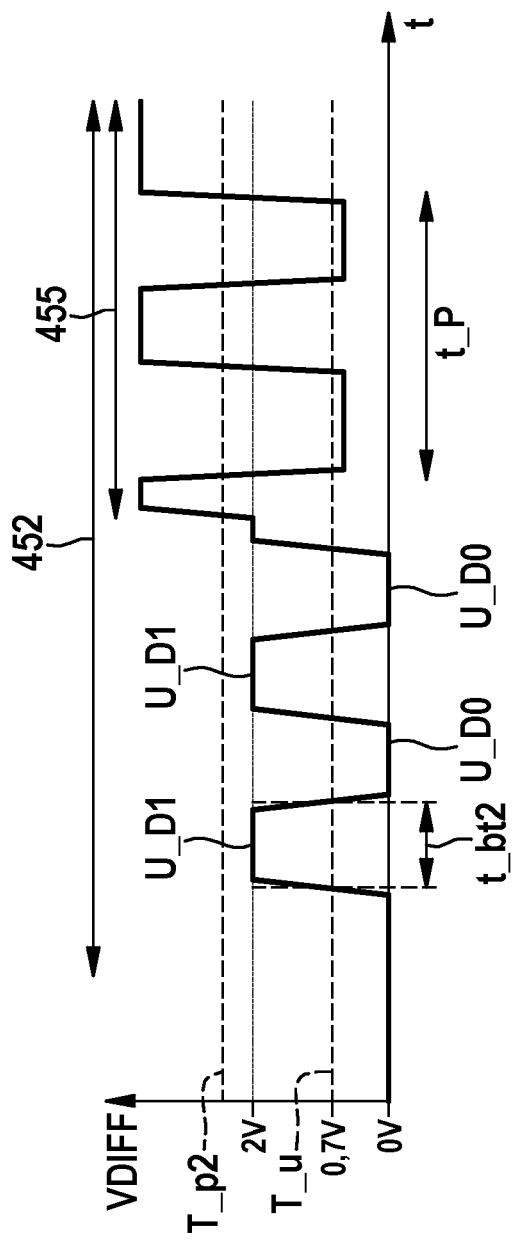
FIG. 10 and FIG. 11 each show the temporal curve of differential voltage VDIFF of FIG. 9, which is evaluated using reception thresholds of a receiver according to a second and a third exemplary embodiment of the present invention.

FIG. 10 illustrates a design of reception threshold adaptation device 15 and of receiver 122 or of transceiver 12 according to a second exemplary embodiment. With the exception of the differences described below, reception threshold adaptation device 15 and receiver 122 or transceiver 12 according to the present exemplary embodiment are designed similarly to the reception threshold adaptation device 15 and receiver 122 or transceiver 12 according to the preceding exemplary embodiment.

Instead of second reception threshold T_p1, reception threshold adaptation device 15 according to FIG. 10 connects in a third reception threshold T_p2 in the data phase. Receiver 122 is thus able to use reception threshold T_p2 in addition to reception threshold T_u for assessment, in order to identify the voltage level of differential voltage VDIFF in TxD1=H, as described above.

If in the event of a transmitted dominant bus state U_D0 reception threshold T_p2 is exceeded, then the conflict is present. Reception threshold T_p2 is above maximum differential voltage VDIFF max of a single transceiver 12, so that T_p2>VDIFF max applies. Maximum differential voltage VDIFF is specified in ISO 11898-2:2016.

The conflict is identified by the transceiver under the following conditions: TxD1=L (low) AND T_p2 exceeded (within the propagation time compensated bit time t_bt2).

In one modification of the above-described exemplary embodiment, reception threshold T_p2 is not permanently set to the aforementioned value. Instead, typical differential voltage VDIFF is ascertained for a dominant bit in the conflict-free state during the transmission of transmitter 121 or transceiver 12 in an adaptive method and reception threshold T_p2 is consequently set in a voltage offset above this ascertained value. This design may be applied to all variants that use reception threshold T_p2.

Figure 11:
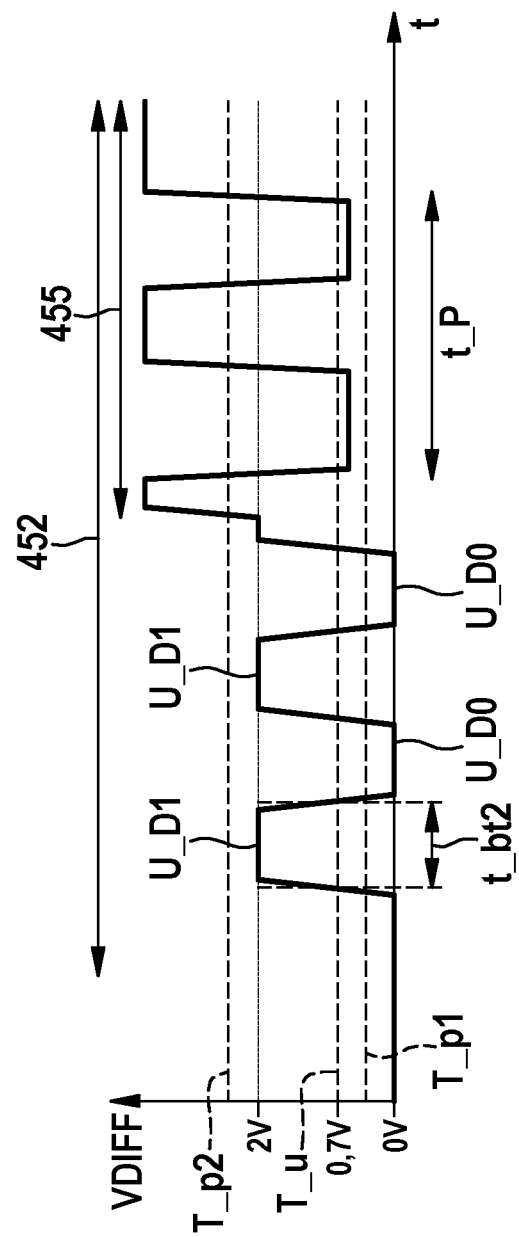

FIG. 11 illustrates one design of reception threshold adaptation device 15 and of receiver 122 or of transceiver 12 according to a third exemplary embodiment. With exception to the following described differences, reception threshold adaptation device 15 and receiver 122 or transceiver 12 according to the present exemplary embodiment are designed similarly to reception threshold adaptation device 15 and receiver 122 or transceiver 12 according to the preceding exemplary embodiments.

According to FIG. 11, reception threshold adaptation device 15 connects in second reception threshold T_p1 as well as third reception threshold T_p2 in data phase 452. As a result, receiver 122 is able to use reception threshold T_p2 in addition to thresholds T_u, T_p1 for assessment, in order to identify the voltage level of differential voltage VDIFF at TxD1=H, as described above.

Reception threshold T_p2 has a value, which is higher than the highest voltage value, which is driven by a user station 10, 20, 30 of bus system 1 for a bus state in second communication phase 452. Using reception threshold T_p2, a transmission conflict is identifiable, which occurs when a bus state U_D0 generated on bus 40 by transceiver 12 based on transmit signal TxD1, is amplified by an error frame 47, error frame 47 being driven as dominant or also U_D0.

Thus, it may be checked for plausibility that a transmission conflict is present on bus 40, in particular, the conflict of transmitting an error frame 47 (error flag).

As a result thereof, it is possible to signal in received signal RXD or in signal S1 to communication control unit 11 which transmission conflict has occurred. Communication control unit 11 is thus not only able to carry out the abort of data phase 452 but, if necessary, by transmitting a bit pattern, to also signal the end of data phase 452 to other user stations 20, 30 and to optionally communicate information about the type of transmission conflict.

According to a fourth exemplary embodiment, receiver 122 or transceiver 12 according to one of the preceding exemplary embodiments is also designed to carry out an assessment of respectively present reception thresholds T_u, T_p1, T_p2 and an assessment of the temporal correlation between transmitted signal TXD or TxD1 and received signal RXD of respective user station 10, 30.

All above-described embodiments of devices 15, 35, of user stations 10, 20, 30, of bus system 1 and of the method carried out therein may be used separately or in all possible combinations. All features of the above-described exemplary embodiments and/or of their modifications may, in particular, be arbitrarily combined. In addition or alternatively, the following modifications, in particular, are possible.

The present invention, even though it is described above as exemplified by the CAN bus system, may be used in any communications network and/or communication method, in which two different communication phases are used, in which the bus states generated for the different communication phases differ. The present invention is applicable, in particular, in developments of other serial communications networks, such as Ethernet and/or 100 Base T1 Ethernet, field bus systems, etc.

Bus system 1 according to the exemplary embodiments may, in particular, be a communications network, in which data are serially transmittable at two different bit rates. It is advantageous, but not necessarily a requirement, that at least for particular periods of time, an exclusive, collision-free access of a user station 10, 20, 30 to a shared channel is ensured in bus system 1.

The number and arrangement of user stations 10, 20, 30 in bus system 1 of the exemplary embodiments is arbitrary. User station 20 in particular, may be omitted in bus system 1. It is possible that one or multiple of user stations 10 or 30 are present in bus system 1. It is possible that all user stations in bus system 1 are identically designed, i.e. only user station 10 or only user station 30 are present.

The number of reception thresholds T_p1, T_p2, which are added to first reception threshold T_u, may also be further increased as described above. In this way, it is possible to even further improve the check for plausibility of the detection of a transmission conflict. However, the effort in evaluating the thresholds increases with the number of connected reception thresholds T_p1, T_p2.

All above-described variants for identifying the transmission conflict may be subject to temporal filtering in order to increase the robustness with respect to electromagnetic vulnerability (EMV) and in relation to electrostatic discharge (ESD), pulses and other interferences.

What is claimed is:

1. A device for a serial bus system, comprising:
a receiver to receive a signal from a bus of the bus system, in which, for a message that is exchanged between user stations of the bus system, a recessive bus state is overwritable by a dominant bus state and the recessive bus state is generated differently in a first communication phase from the recessive bus state in a second communication phase;
wherein the receiver is configured to generate a digital signal based on the signal received from the bus, and to output the digital signal to a communication control unit configured to evaluate data present in the digital signal,
wherein the receiver is also configured to use at least one reception threshold and one second reception threshold in the second communication phase for generating the digital signal, the second reception threshold having a voltage value, which is lower than the voltage value of the first reception threshold or higher than a highest voltage value which, except for an idle state or a standby state, is established on the bus for a dominant bus state in the second communication phase, and
wherein the receiver is configured to also use, in the second communication phase for generating the digital signal, a third reception threshold which has a voltage value that is higher than a highest voltage value which is driven by a user station of the bus system for a bus state in the second communication phase, wherein for the receiver, with the second reception threshold, a different transmission conflict is identifiable than with the third reception threshold.

2. The device as recited in claim 1, wherein the receiver is configured to check at least the second reception threshold in a defined time window in terms of whether the signal received from the bus no longer falls below or exceeds the second reception threshold.

3. The device as recited in claim 1, wherein the recessive and dominant bus states of the signal received from the bus in the first communication phase are generated with a physical layer different from the recessive and dominant bus states the signal received in the second communication phase.

4. The device as recited in claim 1, wherein the recessive and dominant bus states of the signal received from the bus in the first communication phase have a longer bit time than the recessive and document bus states of the signal received in the second communication phase.

5. The device as recited in claim 1, wherein it is negotiated in the first communication phase which of the user stations of the bus system obtains an at least temporarily exclusive collision-free access to the bus in a subsequent second communication phase.

6. The device as recited in claim 1, further comprising:
a reception threshold adaptation device to evaluate the signal received from the bus with respect to a currently present communication phase and to switch the voltage value and a number of reception thresholds used based on a result of the evaluation.

7. The device as recited in claim 1, further comprising a transmitter configured to transmit messages on a bus of the bus system, the transmitter being configured designed to switch between a first operating mode and a second operating mode when transmitting communication phases of each message.

8. The device as recited in claim 7, wherein the transmitter in the first operating mode is designed to generate a first data state as a bus state having different bus levels for two bus wires of a bus line, and to generate a second data state as a bus state having the same bus level for the two bus wires of the bus line, and the transmitter, in the second operating mode, is being configured to generate the bus state for the first data state as in the first operating mode and to generate the bus state for the second data state differently from the bus state for the second data state in the first operating mode.

9. A device for a serial bus system, comprising:
a receiver to receive a signal from a bus of the bus system, in which, for a message that is exchanged between user stations of the bus system, a recessive bus state is overwritable by a dominant bus state and the recessive bus state is generated differently in a first communication phase from the recessive bus state in a second communication phase;
wherein the receiver is configured to generate a digital signal based on the signal received from the bus, and to output the digital signal to a communication control unit configured to evaluate data present in the digital signal,
wherein the receiver is also configured to use at least one reception threshold and one second reception threshold in the second communication phase for generating the digital signal, the second reception threshold having a voltage value, which is lower than the voltage value of the first reception threshold or higher than a highest voltage value which, except for an idle state or a standby state, is established on the bus for a dominant bus state in the second communication phase, and
wherein a reception threshold adaptation device adds to the first reception threshold at least one second reception threshold when, after the first communication phase, in which no exclusive collision-free access of a user station to the bus of the bus system is ensured, a switch is made to a communication phase having the exclusive, collision-free access to the bus.

10. A user station for a serial bus system, comprising:
a communication control unit configured to control a communication of the user station with at least one other user station of the bus system; and
a device including a receiver configured to receive a signal from a bus of the bus system, in which, for a message that is exchanged between user stations of the bus system, a recessive bus state is overwritable by a dominant bus state and the recessive bus state is generated differently in a first communication phase from the recessive bus state in a second communication phase;
wherein the receiver is configured to generate a digital signal based on the signal received from the bus, and to output the digital signal to the communication control unit configured to evaluate data present in the digital signal, and
wherein the receiver is also configured to use at least one reception threshold and one second reception threshold in the second communication phase for generating the digital signal, the second reception threshold having a voltage value, which is lower than the voltage value of the first reception threshold or higher than a highest voltage value which, which, except for an idle state or a standby state, is established on the bus for a dominant bus state in the second communication phase, and
wherein the device is configured to signal the communication control unit using the received signal or using a signal via a separate line, if an evaluation of reception thresholds indicates that a transmission conflict is present on the bus, and the communication control unit being configured to generate or to abort a transmit signal based on the signal and/or to signal the transmission conflict to other user stations of the bus system.

11. A user station for a serial bus system, comprising:
a communication control unit configured to control a communication of the user station with at least one other user station of the bus system; and
a device including a receiver configured to receive a signal from a bus of the bus system, in which, for a message that is exchanged between user stations of the bus system, a recessive bus state is overwritable by a dominant bus state and the recessive bus state is generated differently in a first communication phase from the recessive bus state in a second communication phase;
wherein the receiver is configured to generate a digital signal based on the signal received from the bus, and to output the digital signal to the communication control unit configured to evaluate data present in the digital signal, and
wherein the receiver is also configured to use at least one reception threshold and one second reception threshold in the second communication phase for generating the digital signal, the second reception threshold having a voltage value, which is lower than the voltage value of the first reception threshold or higher than a highest voltage value which, which, except for an idle state or a standby state, is established on the bus for a dominant bus state in the second communication phase, and
wherein the device is configured to signal the communication control unit using the received signal or using a signal via a separate line, when an evaluation of reception thresholds and of a temporal correlation between a transmit signal and the received signal indicates that a transmission conflict is present on the bus, and the communication control unit being configured to generate or to abort the transmit signal based on the signal and/or to signal the transmission conflict to other user stations of the bus system.

12. A bus system, comprising:
a bus; and
at least two user stations which are connected to one another via the bus so that they are able to serially communicate with one another and of which at least one user station is a user station that includes:
a communication control unit to control a communication of the user station with at least one other user station of the bus system, and
a device including a receiver to receive a signal from the bus of the bus system, in which, for a message that is exchanged between user stations of the bus system, a recessive bus state is overwritable by a dominant bus state and the recessive bus state is generated differently in a first communication phase from the recessive bus state in a second communication phase,
wherein the receiver is configured to generate a digital signal based on the signal received from the bus, and to output the digital signal to the communication control unit configured to evaluate data present in the digital signal, and
wherein the receiver is also configured to use at least one reception threshold and one second reception threshold in the second communication phase for generating the digital signal, the second reception threshold having a voltage value, which is lower than the voltage value of the first reception threshold or higher than a highest voltage value which, except for an idle state or a standby state, is established on the bus for a dominant bus state in the second communication phase, and wherein the receiver is configured to also use, in the second communication phase for generating the digital signal, a third reception threshold which has a voltage value that is higher than a highest voltage value which is driven by a user station of the bus system for a bus state in the second communication phase, wherein for the receiver, with the second reception threshold, a different transmission conflict is identifiable than with the third reception threshold.

13. A method for providing communication in a serial bus system, by using a receiver to receive a signal from a bus of the bus system, the method comprising:

receiving a signal from a bus of the bus system, in which for a message that is exchanged between user stations of the bus system, a recessive bus state is overwritable by a dominant bus state, and the recessive bus state is generated differently in a first communication phase from the recessive bus state in a second communication phase;

generating a digital signal based on the signal received from the bus; and outputting the generated digital signal to a communication control unit configured to evaluate data present in the digital signal, the receiver using at least one first reception threshold and one second reception threshold for generating the digital signal in the second communication phase, the second reception threshold having a voltage value which is lower than a voltage value of the first reception threshold or higher than a highest voltage value which, except for an idle state or a standby state, is established on the bus for the dominant bus state in the second communication phase, and wherein the receiver is configured to also use, in the second communication phase for generating the digital signal, a third reception threshold which has a voltage value that is higher than a highest voltage value which is driven by a user station of the bus system for a bus state in the second communication phase, wherein for the receiver, with the second reception threshold, a different transmission conflict is identifiable than with the third reception threshold.

* * * * *

UNITED STATES PATENT AND TRADEMARK OFFICE
CERTIFICATE OF CORRECTION

| | | |
|---|---|---|
| PATENT NO. | : 11,487,687 B2 | Page 1 of 1 |
| APPLICATION NO. | : 17/414097 | |
| DATED | : November 1, 2022 | |
| INVENTOR(S) | : Arthur Mutter et al. | |

It is certified that error appears in the above-identified patent and that said Letters Patent is hereby corrected as shown below:

On the Title Page

In Item (86) PCT No.: PCT/EP2019/084704
§371 (c)(1), (2) Date:
Replace:
"June 15, 2021"
With:
--August 11, 2021--

Signed and Sealed this
Twentieth Day of December, 2022

Katherine Kelly Vidal
*Director of the United States Patent and Trademark Office*